Patented Feb. 9, 1943

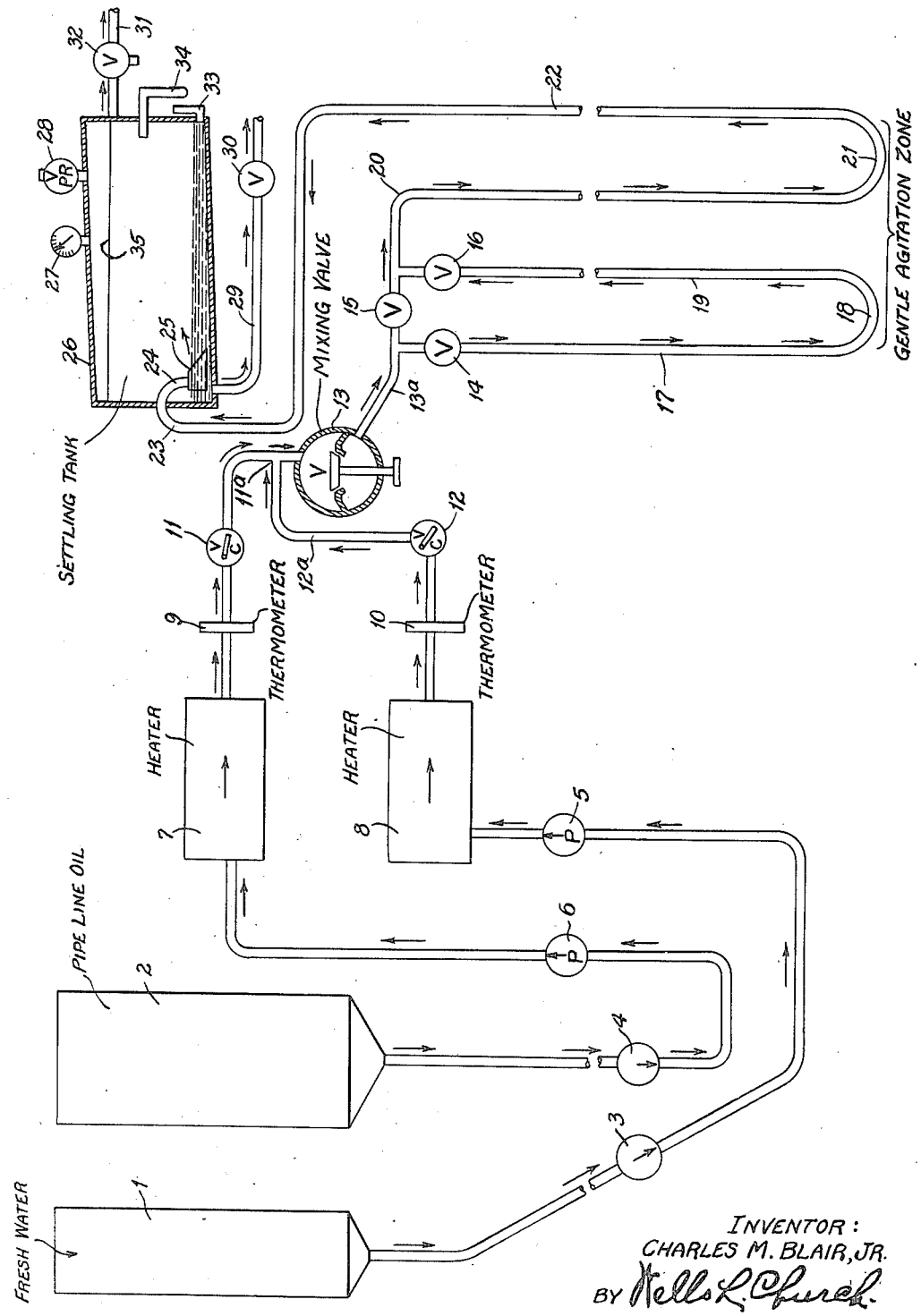

2,310,673

UNITED STATES PATENT OFFICE 2,310,673

PROCESS FOR TREATING PIPELINE OIL

Charles M. Blair, Jr., Webster Groves, Mo., assignor to Petrolite Corporation, Ltd., Wilmington, Del., a corporation of Delaware Application April 22, 1942, Serial No. 440,097

6 Claims. (Cl. 252—348)

This invention relates to the treatment of petroleum oils for the purpose of removing or reducing the amount of certain objectionable substances in the same, and is particularly concerned with the removal of water-soluble impurities from crude petroleum.

The main object of my invention is to provide a practicable process for removing water-soluble impurities, particularly dissolved inorganic salts from certain petroleum oils, topped oils, and crude oil fractions obtained by distillation, such oils being characterized by the fact that the ratio of the A. P. I. gravity of such oil to its spreading coefficient on distilled water at 25° C. is equal to or greater than 1.9 when these properties are expressed in the units called for below.

The production of crude oil generally is accompanied by the production of naturally-occurring brines, and such brines are usually suspended or emulsified in the crude oil. In many cases such suspended brine will settle out rapidly on permitting the emulsion to stand quietly. In other cases, however, the brine is so thoroughly emulsified in the oil, that a separation will not take place, even on prolonged standing. Such oil is commonly referred to as cut oil, roily oil, emulsified oil, etc., and represents an emulsion of the water-in-oil type.

Before such oil becomes marketable, its content of emulsified water or brine must be reduced to a relatively low value. The upper limit for such water or brine content is usually 2%, but is more apt to be 1% or 0.5%, or slightly less. Such dehydrated oil is commonly referred to as "pipeline oil," since it meets the specifications set by the purchasing companies. The water, per se, present in the small amount of residual emulsion contained in the oil, does not appear to be particularly objectionable in its effect on refining equipment or other equipment involved in its handling. However, in the great majority of cases the residual emulsion contained in the pipeline oil does not consist of pure water, but is composed of an aqueous solution of inorganic salts, which was originally produced with the crude oil when it emerged from the ground. It has been found that such salts accompanying the oil are generally very objectionable to the refiner of the petroleum, and that it becomes extremely desirable to remove these impurities prior to further refining steps.

The presence of such inorganic salts in crude petroleum leads to two principal troubles, i. e., stoppage of flow or restriction of flow, and corrosion; and these combine to result in effects such as plugging of heat exchangers, decreased heat transfer, increased replacement costs, accelerated coke formation, lowered quality of products, lowered yields of valuable products and greater labor requirements.

Numerous attempts have been made to remove this residual salt, particularly that in the form of emulsified brine, from petroleum. On first sight, it might appear that this could be accomplished by applications of methods commonly employed for treatment of ordinary emulsified oil in the field. However, the conditions obtaining in the refinery where the salt removal operation is usually carried out, are generally different from those obtaining in the oil field, where the emulsion, as originally produced, is dehydrated down to the pipeline requirements. In the latter case the emulsion may contain a large percentage of dispersed water or brine; whereas, pipeline oil, considered as an emulsion, is apt to contain only a few tenths of a percent of water as the dispersed phase, and very seldom over 2%. In the average field dehydration plant the daily capacity is usually sufficiently small to permit very long settling times, perhaps as much as twenty-four hours or more; whereas, in the refinery the daily capacities are much higher and usually sufficient space is not available to permit more than two hours settling time, and often one hour or less is the longest settling period available. Pipeline oil, as a rule, represents an aged emulsion which is usually weeks old and may be months or even years old. As a result, the dispersed particles in this emulsion are highly stabilized and difficult to resolve. Furthermore, these aged emulsion particles have previously been subjected to the action of some demulsifying means when the oil was originally treated in the field, and having come through such treatment, must represent the more refractory and less resolvable portion of the original emulsion.

The removal of inorganic salts from pipeline oil, in other ways, differs markedly from the ordinary field dehydration or cut oil or roily oil. In the latter case the operation results in the conversion of a non-marketable material into a marketable one, and consequently, this operation will justify a relatively high cost. In removal of water-soluble impurities from the pipeline oil, the change brought about is one of degree, rather than of kind, and the justified expense is relatively small.

Since the water-soluble impurities contained in pipeline oil generally occur in the form of an aqueous solution in the remaining few tenths of a percent of emulsified water, it is clear then that the problem of the removal of these impurities can be solved, at least theoretically, by the removal of this remaining emulsified water. Numerous methods have been proposed and employed for effecting this removal. The simplest methods proposed have involved mechanical operations, such as sedimentation or filtration, or a combination of these; but such methods are generally unsatisfactory, due to the fact that the small amount of residual emulsion contained in the oil usually consists of extremely fine droplets, often less than $10^{-4}$ cm. in diameter; and as a result, the rate of sedimentation is extremely small, and the rate of coalescence to form droplets of larger size is also small. Filtration procedures usually result in rapid clogging of the filtering medium, involving frequent replacement and its attendant expense. Such methods have found very limited application in actual practice.

It appears to be extremely difficult to remove the last tenth of a percent or so of emulsified brine from a petroleum oil by any common means of demulsification, be it mechanical, electrical, or chemical. Yet, the amount of inorganic salts which can be carried by even 0.1% of emulsified brine, may be much more than enough to cause serious difficulties during the refining process.

Mechanical procedures have also been proposed for use in connection with the introduction or dispersion of fresh water in the oil in predetermined amounts to act as a washing medium for removal of water-soluble impurities. However, on dispersing or mixing water with oil, it generally becomes emulsified, due to the presence of emulsifying agents commonly occurring in the oil, and the problem of removal of both the original emulsion particles and the added salt-free water arises. Here again, the rate of sedimentation of particles is generally too small to permit successful operation, and due to the protective action of the emulsifying agent in the petroleum, coalescence of drops, is prevented or reduced. Where a filtration procedure is employed, the filter rapidly becomes clogged with emulsion particles, which results in stoppage of the flow and necessitates careful attention and frequent replacement of the filtering medium.

One method which has been proposed and employed is to use an electrical dehydrator of the kind commonly employed in the resolution of cut oil to separate the prepared emulsion of predetermined water content, as previously described. In many instances, the adoption of the electrical dehydration process is eminently satisfactory, but it involves an added expense in the cost of an electrical dehydrator, and often requires the attention of a skilled operator to obtain uniformly successful results.

Another procedure which has been proposed is to subject an emulsion or dispersion of a predetermined amount of fresh water in the pipeline oil, to the action of a chemical demulsifier of the kind ordinarily used in the resolution of roily oil, or cut oil, followed by a settling period so as to permit sedimentation of the water particles. Such procedure, although it represents the simplest operative steps, in that no expensive apparatus must be purchased, and in that no skilled attention is required, still has proven unsatisfactory, in that little or no separation takes place within the limits of refinery economy. In other words, in the ordinary refinery practice separation must take place relatively rapidly, usually within less than two hours, and often within less than one hour. This is true for various reasons, but there is one reason alone which is sufficient, and that is, in order to obtain chemical demulsification, one usually must heat the oil; and in order to prevent the loss of heat units, it is necessary that such heated oil be transferred to the furnace and fractionating still without delay, so that there will not be any marked heat loss. This is diametrically opposite to the practice which is employed in the oil fields. In oil field practice emulsified oil may be heated to any desirable temperature, and may require twenty-four hours for separation. The fact that the heat units are lost during such long period is absolutely immaterial, because the oil must be cooled in any event before it is marketable. For this reason procedures which are satisfactory in oil field practice fail utterly in desalting practice, for the reason indicated, i. e., inability to produce a rapid break.

In order to avoid heat losses, as has been previously pointed out, separation must be relatively fast in ordinary refinery practice. It also must be rapid for another reason, and that is, that space is not available, as a rule, to permit long periods of settling, such as are feasible and commonly used in oil field practice concerned with the resolution of cut or roily oil. The importance of all this, of course, is appreciated to a greater degree when one realizes that the through-put of the average refinery is much greater than the through-put of an ordinary field treating plant.

Attention is directed to my U. S. Patent No. 2,252,959, dated August 19, 1941. Said patent is concerned with a process for treating pipe line oil to reduce the inorganic salt content of the oil, which comprises mixing fresh water with the pipe line oil in such a manner as to produce an admixture in which a major portion of the original water droplets co-exist with but are not combined with the droplets of the added water, heating at least the oil of the admixture to bring the admixture to a suitable elevated breaking temperature, subjecting the heated admixture in the presence of added chemical demulsifier to a period of gentle agitation characterized by a Reynolds number of between 2100 and 300,000, for a period of from 2 to 5 minutes, to effect coalescence to a large extent of the original water droplets with the co-existing water droplets, accompanied by coalescence of the added water droplets so that the coalesced water masses will remove the greater part of the salt content of the original pipeline oil, settling the admixture and separating the oil and water phases.

I have now discovered that certain particular types of crude oil may be successfully desalted even in the absence of a chemical demulsifier by applying the gentle after-agitation of the kind described in my said aforementioned patent. The gentle after-agitation employed is of the same character as that described in said aforementioned United States patent, but may also be varied in respect to the temperature range and also in respect to the time factor, that is, where that particular patent is concerned with the period of gentle after-agitation, lasting from two to five minutes, one may, in the present instance, employ 10, 15, or even 30 minutes, and furthermore, one might employ a temperature higher than 300° F., referred to in said patent, and one might employ a gauge pressure greater than that of 200 pounds, referred to in said aforementioned patent. However, my preferred method of operation employs the same identical after-agitation, both in kind and character, as that described in my said aforementioned United States patent. I will subsequently describe in detail the characteristics or criteria of the crude oils or pipeline oils which may be desalted in the manner herein contemplated.

In the herein described process which constitutes my present invention, the fresh water is added to the oil stream in a predetermined and controlled amount, and is then dispersed or mixed into the oil in such a manner that actual physical mixing of fresh water and original brine does not take place to any great extent. In such an emulsion, the original brine droplets contained in the oil retain their identity and are present in substantially their original concentration, and undiluted by the added fresh water, which is dispersed into the oil in the form of separate droplets. To state it in another way, my process contemplates mixing the fresh water with the oil in such a manner and in such proportions as to cause a major portion of the original water droplets to co-exist with the droplets of the added water, without however, causing a predominant portion of the impurities in the original water droplets to become immediately associated or combined with the fresh added water.

In those rare cases where the oil contains dispersed particles of solid salt or other solid water-soluble impurities, the proper emulsification of the fresh water in the oil will yield a dispersion again containing two kinds of dispersed phase, solid salt and fresh water. In some instances both solid salt and brine may be present in the pipe line oil. Here, addition of fresh water can lead to the formation of a dispersion containing three internal phases.

Any suitable means may be employed to bring about this admixture, dispersion or emulsification of the kind described. Sometimes the natural passage or commingling of the fluids as they are forced through a pump will be sufficient. A convenient and easily controlled method of obtaining the desired dispersion is to pass the fluids through a so-called globe valve or weighted pressure relief valve giving a predetermined and functionally satisfactory pressure drop. In other instances, the passage of the fluids through orifice plates, baffle pipes or pieces of equipment such as heat exchangers or small coils, may be used to obtain satisfactory dispersion. The agitation required to obtain the desired dispersion or emulsion is generally relatively violent or vigorous. It must be sufficiently intense to cause distribution or dispersion of the added fresh water into smaller droplets, but not so intense as to result in shearing of many of the small brine droplets originally present in the oil.

I have found that the droplet sizes of dispersed salt-free water may vary over quite wide limits; but best results are usually obtained if the water is dispersed sufficiently to give an average particle size of about 3 mu to 200 mu in diameter. Such reference to size obviously does not apply to every droplet dispersed in the oil, but to the greater proportion of droplets. As previously mentioned, satisfactory results may be obtained with emulsions having a wide range of particle sizes; and it is immaterial whether the emulsion is relatively homogeneous or not.

In view of the fact that the effectiveness of the entire process is dependent upon the employment of gentle agitation, under conditions which are functionally sufficient, it appears extremely desirable to describe or define gentle agitation for the purpose of its employment in the herein described process. Generally speaking, agitation of the proper kind can readily be obtained by turbulent flow through ordinary pipe and its attendant fittings. This avoids the use of additional expensive machinery, or an especially prepared mixing device. Furthermore, it often happens that such gentle agitation, by means of turbulent flow, can be obtained by proper arrangement of equipment normally used in refinery processing. In any event, such arrangement can usually be obtained at only slight additional expense by some minor adaptation or conversion of available or existing equipment. It is understood, however, that a person skilled in the art could employ any suitable means, device or method which would give gentle agitation comparable or analogous in nature to that hereinafter described in detail. It is understood that the present invention is not limited to use of gentle agitation obtained only by turbulent flow through ordinary pipe and fittings, but that any equivalent procedure is suitable.

As is well understood, the character of flow in pipes is dependent upon several variables, such as size of pipe, velocity of flow, viscosity of the fluid, and density of the fluid. The nature of the flow may be characterized by a dimensionless constant, known as the "Reynolds number." This number for flow in any particular system may be calculated from the variables which have just been mentioned, and it has been found by extensive experimentation that when this figure is greater than about 2,100, the flow is turbulent, in contradistinction to streamline or viscous flow. Where fluids flow through constrictions or through pipe fittings, such as bends and turns, the Reynolds number characterizing the agitation at these points may be estimated from a consideration of the pressure drop through these constrictions or fittings and of the actual structural arrangements. For a discussion of the Reynolds number and methods of calculating the same see "Principles of Chemical Engineering," by Walker, Lewis, McAdams and Gilliland, McGraw-Hill, 1937, page 60 et seq.

Obviously, if the flow becomes extremely turbulent, or if the pressure drop through the system becomes too abrupt, one no longer obtains the gentle agitation of the kind contemplated. Therefore, it has been found that the fluid flow, characterized by a Reynolds number larger than about 200,000, or perhaps 300,000, can no longer, for the purposes of the present invention, be considered as gentle agitation. When the Reynolds number exceeds this upper limit of 200,000 to 300,000, one obtains violent agitation, with attendant shearing action, on dispersed water droplets.

Although it may be true that it is difficult to determine the Reynolds number with extreme accuracy when the value is considerably in excess of the upper limits previously mentioned, however, examination of many devices, such as emulsifying valves, orifice plates, etc., indicates a Reynolds number so high that even though it is determined only approximately, and even though the error in determination may be substantial, yet obviously, it is of a range far beyond the indicated maximum limit. Such agitation is unsuited for the step or stage prior to separation or settling. Thus, gentle agitation, as herein contemplated, is the kind characterized by a Reynolds number of 2,100 to 300,000, or its functional equivalent.

The water employed in my process should be as free from inorganic salts as possible. In actual practice one must employ the most suitable water which happens to be available at the particular installation. In such circumstances the fresh water may, in fact, carry minor or unobjectionable quantities of salts. There is no fixed rule as to the amount of water which shall be added, but generally speaking, it approximates five to twenty times the amount of brine which is present, or, in a general way, it approximates 3% to 10% by volume of the pipeline oil being subjected to treatment. Factors which determine the amount of water are cost of water, ease of disposal, salt content of the crude to be treated, and loss of heat units in draw-off water, unless such heat units can be utilized in a suitable manner. It is unusual to obtain effective treatment with less than 2% of added water, and it is unusual to find circumstances which require more than 10% of added water.

The terms "fresh water" and "salt-free water" have been used throughout the previous discussion to describe the water added to the oil in my process, and it has been pointed out that as pure water as possible should be used in the process. However, in some instances it may become necessary or desirable for reasons of economy or convenience, to use a water of relatively high salt content, or a so-called brackish or hard water. In some instances some of the water settling out in the settling vessel employed in the present process may be mixed with fresh water, and this mixture then added to the oil entering the salt-removal system. In this case, part of the water used in the process is recycled. However, in all such cases as these where other than strictly fresh water is employed, the concentration in such water of those compounds which are to be removed from the oil must be lower than the concentration of these same constituents in the brine forming the dispersed phase in the pipeline oil. In other words, the water added in the process should be more free of the impurities to be removed from the oil than is the dispersed aqueous phase in the original oil. The terms "fresh water" and "salt-free water," as used in the claims, will be intended to include such water as above described.

Where somewhat brackish or hard water is employed in the process, results usually will not be quite as good as where the same volume of strictly fresh water is used.

In view of what has been said, it hardly appears necessary to describe the procedure, because obviously, one need do nothing more than employ the procedure described in detail in my aforementioned United States patent, and eliminate the use of the chemical demulsifier, provided, however, that one has selected a crude oil or pipeline oil of the kind hereinafter described, and which is the type that I have found to be susceptible to this particular treatment. However, by way of caution, the following description is included, and it may be desirable to compare such description with the procedural steps specified in my aforementioned United States patent.

In actual plant practice temperatures of the oil and water employed in a desalting operation may vary considerably. However, it has been found from actual experience that after suitable homogenization or emulsification of the added fresh water or weak brine, more rapid sedimentation takes place, if the temperatures are relatively high. After having obtained such suitable temperature, the whole mass is subjected to gentle agitation, and then settled for a short period of time, or for a length of time sufficient for separation of the aqueous phase. All other things being equal, the temperature at which this settling is allowed to take place should be as high as possible, without being so high as to cause a violent vaporization and attendant agitation in the settler under the existing pressure. Average temperatures may vary from 160° F., to 300° F. Pressure in the settler may be less than atmospheric, or preferably, greater than atmospheric, that is operating under conditions that will show a gauge pressure of 5 to 200 pounds, with 10 to 100 pounds as the usual range, but sufficiently high to prevent vaporization and attendant turbulence in the settler.

No description is necessary for indicating a suitable means for heating either the water or oil. Needless to say, the same means are employed as would be used for other purposes. The water may be heated by any suitable means, and the oil may be heated by any device of the kind regularly employed in refinery practice. As a means of obtaining gentle agitation, I have found it most desirable to use a circuit of ordinary pipe varying from 2 to 8 or 10 inches in diameter, depending upon the fluid through-put, so as to give a Reynolds number of approximate range of 5,000 to 50,000. Settling may take place in any suitable vessel, with a suitable inlet to receive the mixture of liquids after the period of gentle agitation, provided, of course, that there is the proper outlet for the draw-off water and for the desalted oil. Such vessel, of course, would be so constructed as to withstand the accompanying pressure, if any. As to the period of gentle agitation, as previously pointed out, it may vary from one-half minute to thirty or more minutes; but I prefer to use whatever period appears as the result of the natural path through the plant circuit, unless such period is not sufficient; and in that event, I prefer to increase the period of gentle agitation to the value which produces rapid settling in the subsequent stage. Generally speaking, gentle agitation for a period of two to five minutes is sufficient.

In view of what has been said previously, it appears that further description as to the most suitable manner of carrying out my process is unnecessary. However, it may be desirable to indicate the nature of the steps in an ordinary plant, which, of course, may be changed or adapted to meet particular needs. Reference to the drawing is made hereinbelow:

In the accompanying drawing I have illustrated an apparatus that may be used for practicing my process above described. In said drawing the reference character 1 designates a storage tank of suitable capacity for holding fresh water, 2 designates a similar storage tank of larger capacity, adapted to hold pipeline oil, 3 designates a measuring device to determine the fresh water through-put, 4 designates a similar measuring device to determine the pipeline oil through-put, 5 designates a pump to actuate the movement of fresh water, 6 designates a similar pump to move the pipeline oil, 7 designates a heater of the conventional type for heating pipeline oil to any predetermined temperature, as previously indicated, 8 designates a similar heater for fresh water, and 9 designates a thermometer to record the temperature of the heated pipeline oil.

In said drawing the reference character 10 designates a suitable thermometer to record the temperature of the heated fresh water, 11 designates a check valve to insure the forward flow of the pipeline oil, 12 designates a check valve to insure the forward flow of fresh water, 11a designates the junction inlet of heated pipeline oil and fresh water into the emulsifying valve, 12a designates the fresh water line to the junction point, 13 designates an adjustable emulsifying valve of the balanced pressure type, which may be opened completely to act as a by-pass or conduit, if desired, 13a designates an outlet from the emulsifying valve, and 14, 15 and 16 designate valves to determine or regulate the length and time of circuit through the gentle agitation zone.

The said apparatus is equipped with any suitable means that will give one or more zones of gentle agitation, such, for example, as a pipe circuit 20, 21 and 22, that gives one zone of gentle agitation, and a separate and distinct pipe circuit 17, 18 and 19 that gives a second zone of gentle agitation. The reference character 23 designates the outlet from the gentle agitation zone and inlet to settler, 26 designates the settling tank and generally operates under pressure, 24 designates the inside conduit to the distributor shoe, 25 designates the distributor shoe to prevent undue turbulence, 27 designates a pressure gauge to measure the pressure in the settler, 28 designates a relief valve for the protection of the settler, 29 designates a separated waste water outlet to the sump, 30 designates the control valve for the waste water outlet, 31 designates the desalted pipeline oil outlet to the still, 32 designates a sampling valve for obtaining a sample of desalted pipeline oil as it goes to the still, 33 designates a sampling valve to measure the height of the settled water layer, 34 designates a thermometer to record the temperature of the outgoing desalted pipeline oil, and 35 designates the upper surface of separated oil phase.

Actual operation, of course, is obvious from the previous description. When the operation is started, oil is pumped from tank 2 to heater 7. Simultaneously, fresh water is pumped from the storage tank 1 through the metering device 3, and pump 5 to heat exchanger, indicated by 8. The speeds of the pumps are regulated so that the metering devices 3 and 4 indicate the proper predetermined proportion. The heaters 7 and 8 are regulated so that both water and oil leave the heaters at the proper temperature, as indicated by thermometers 9 and 10. The emulsifying valve 13 is set to a properly determined pressure, and if desired, may be equipped with a sampling valve, so that a sample may be withdrawn and examined microscopically, in order to determine the particle size distribution. Valves 14 and 16 are closed, and valve 15 is permitted to remain open. The heated commingled fluids pass from outlet 13a through the circuit indicated by 15, 20, 21, 22 and 23 to the settler. When sufficient water has accumulated in the settler, it is drawn off by means of the outlet 29 and control valve 30. The proper temperature and pressure conditions in the settler are indicated by the pressure gauge 27 and thermometer 34. Samples of oil are taken from the sampler 32 and examined for salt content. The upper oil level in the settler is indicated by line 35. Such operation should be successful from the start, and should not involve difficulties. If desired, violent agitation for producing distribution, or emulsification, of the fresh water may be replaced by a device providing gentle agitation only. For instance, if desired, the emulsifying valve 13 may be opened wide, so that it acts only as a by-pass or outlet. Valves 14 and 16 are opened, and valve 15 closed. This then forces the fluids through a longer or double zone of gentle agitation, and the extra zone of agitation, characterized by the circuits 17, 18 and 19, although supplying only gentle agitation, is the functional equivalent of the instantaneously acting emulsifying valve, or its equivalent.

Obviously, chemical examination is required to determine if the process is working satisfactorily, for instance, generally speaking, a successful plant should remove at least 75% of the salt present in the original pipeline oil, and the absolute values of salt content should be as low as 25 pounds per 1,000 barrels, and exceptionally good practice will often reduce the value to 20 pounds or less per 1,000 barrels of pipeline oil. It is to be noted that methods for the analysis of the salt content of both pipeline oil and desalted oil are recorded in the literature and do not require further elaboration.

As mentioned above, the present process is not applicable to any and all crude oils. I have found that only oils having certain measurable physical properties are amenable to the present desalting procedure in which no chemical demulsifier is employed. In particular, those oils for which the ratio of A. P. I. gravity to spreading coefficient on distilled water at 25° C., is equal to or greater than 1.9, are capable of being desalted by the present procedure.

The A. P. I. gravity of an oil is a function of its specific gravity at 60° F. The definition of A. P. I. gravity is well known, and is given, for example, in "New and Revised Manual for Inspectors of Petroleum," 20th edition, page 8; C. J. Tagliabue Mfg. Co., Brooklyn, N. Y. Where the specific gravity of the oil is determined at a temperature other than 60° F., the A. P. I. gravity may be obtained by the use of the formula given in the "New and Revised Manual for Inspectors of Petroleum," referred to above, and appropriate tables contained in same.

The spreading coefficient of an oil on water is obtained from measurements of the surface tension of the water, the surface tension of the oil, and the interfacial tension at the oil-water interface. This quantity is expressed in dynes per centimeter, and is defined as the value obtained by subtracting the sum of the surface tension of the oil and the interfacial tension at the oil-water interface from the value of the surface tension of water. This may be expressed mathematically as follows:

$$S = Tw - (To + Tow)$$

where S is the spreading coefficient, $Tw$ is the surface tension of water, $To$ is the surface tension of the oil, and $Tow$ is the interfacial tension at the oil-water interface, all values being expressed in dynes per centimeter.

A discussion of the spreading coefficient, and its measurement and significance, may be found in almost any treatise on colloid chemistry, as, for example, in "Industrial Chemistry of Colloidal and Amorphous Materials," by Lewis, Squires and Broughton, page 49; The Macmillan Co., New York, 1942.

The measurements of surface and interfacial tension values required for determining the spreading coefficient, may be made by any acceptable method, such as the drop-weight method, the capillary-rise method, the ring method, etc., care being taken to apply the appropriate standard corrections to the measured values. The spreading coefficient used in the present instance is that determined at approximately 25° C. Actually, the value of the spreading coefficient varies somewhat with temperature, so it is desirable that the measurements be made at a temperature as near to 25° C. as is practicable.

The A. P. I. gravity of crude petroleums varies from about 8 to about 60. The spreading coefficients of crude oils on distilled water at 25° C. are invariably positive and range in value from about 5 to about 30 dynes per cm. The ratio of A. P. I. gravity of an oil to its spreading coefficient on water generally will fall somewhere in the range from about 0.35 to about 3.2. Only those oils for which this ratio is equal to or greater than 1.9 have been found amenable to a desalting operation by the present procedure. This requirement may be expressed mathematically as follows:

Let $$K = \frac{\text{A. P. I. gravity of oil}}{\text{Spreading coefficient of oil}}$$

Then, for the oils which may be desalted by the present procedure, the following relation obtains:

$$K \geqslant 1.9$$

As an example, an oil having an A. P. I. gravity of 35 degrees must have a spreading coefficient of 18.4 dynes per c. m., or less, to be susceptible to successful desalting by the present process.

Having thus described my invention, what I claim as new and desire to secure by Letters Patent is:

1. A process for reducing the inorganic salt content of pipeline oil of the kind for which the ratio of A. P. I. gravity to spreading co-efficient on distilled water is equal to or greater than 1.9, which comprises mixing fresh water with such pipeline oil in such a manner as to produce an admixture in which a major portion of the original water droplets co-exist with but are not combined with the droplets of the added water, heating at least the oil of the admixture to bring the admixture to a suitable elevated breaking temperature, subjecting the heated admixture to a period of gentle agitation characterized by a Reynolds number of between 2,100 and 300,000, for a period of from 2 to 30 minutes to effect coalescence to a large extent of the original water droplets with the co-existing water droplets, accompanied by coalescence of the added water droplets so that the coalesced water masses will remove the greater part of the salt content of the original pipeline oil, settling the admixture and separating the oil and water phases.

2. A process for reducing the inorganic salt content of pipeline oil containing less than 1% of natural brine and of the kind for which the ratio of A. P. I. gravity to spreading co-efficient on distilled water is equal to or greater than 1.9, which comprises mixing fresh water with the pipeline oil in such a manner as to produce a mixture in which a major portion of the original brine droplets co-exist with but are not combined with droplets of the added water, heating at least the oil of the admixture to bring the admixture to a suitable elevated breaking temperature, subjecting the heated admixture to gentle agitation characterized by a Reynolds number of between 2,100 and 300,000, for a period of from 2 to 30 minutes, so as to effect coalescence to a large extent of the original brine droplets with the co-existing added water droplets, accompanied by coalescence of the added water droplets so that the coalesced water masses will remove the greater part of the salt content of the original pipe line oil, and settling the admixture and separating the oil and water phases.

3. A process for removing the inorganic salt content of pipeline oil containing brine droplets and of the kind for which the ratio of A. P. I. gravity to spreading co-efficient on distilled water is equal to or greater than 1.9, which comprises mixing fresh water with the pipeline oil and passing the same through an emulsifying device to produce an admixture in which a major portion of the original brine droplets co-exist with but are not combined with the droplets of the added water, heating at least the oil of the admixture to bring the admixture to a suitable elevated breaking temperature, subjecting the heated admixture to a period of gentle agitation characterized by a Reynolds number of between 2,100 and 300,000 and for a period of from 2 to 30 minutes to effect coalescence to a large extent of the original brine droplets with the co-existing added water droplets, accompanied by coalescence of the added water droplets so that the coalesced water masses will remove the greater part of the salt content of the original pipeline oil, and settling the admixture and separating the water and oil phases.

4. A process for reducing the inorganic salt content of pipeline oil containing brine droplets and of the kind for which the ratio of A. P. I. gravity to spreading co-efficient on distilled water is equal to or greater than 1.9, which comprises mixing fresh water with the pipeline oil in such a manner as to produce an admixture in which the major portion of the original brine droplets co-exist with but are not combined with the droplets of the added water which range in size from 3 mu to 200 mu, heating at least the oil of the admixture to bring the admixture to a suitable elevated breaking temperature, subjecting the heated admixture to a period of gentle agitation characterized by a Reynolds number of between 2,100 and 300,000, for a period of from 2 to 30 minutes, to effect coalescence to a large extent of the original brine droplets with the co-existing added water droplets, accompanied by coalescence of the added water droplets so that the coalesced water masses will remove the greater part of the salt content of the original pipeline oil, and settling the admixture and separating the oil and water phases.

5. A process for removing the inorganic salt content of pipeline oil containing brine droplets and of the kind for which the ratio of A. P. I. gravity to spreading co-efficient on distilled water is equal to or greater than 1.9, which comprises mixing with the pipeline oil between 2 and 10% of fresh water in such a manner as to produce an admixture in which a major portion of the original brine droplets co-exist with but are not combined with the droplets of the added water, bringing the admixture to a suitable elevated breaking temperature, then subjecting the heated admixture to a period of gentle agitation characterized by a Reynolds number of between 2,100 and 300,000, for a period of from 2 to 30 minutes, to effect coalescence to a large extent of the original water droplets with the co-existing added water droplets, accompanied by coalescence of the added water droplets so that the coalesced water masses will remove the greater part of the salt content of the original pipeline oil, and settling the admixture and separating the oil and water phases.

6. A process for reducing the salt content of pipeline oil containing less than about 1% of brine and of the kind for which the ratio of A. P. I. gravity to spreading co-efficient on distilled water is equal to or greater than 1.9, which comprises mixing the oil with from 2 to 10% by volume of fresh water, emulsifying the same so that the major portion of the original brine droplets co-exist with but are not combined with droplets of the added water, bringing the emulsion to a suitable elevated breaking temperature, subjecting the emulsion at said elevated breaking temperatures to a period of gentle agitation of from 2 to 30 minutes and at a Reynolds number of 2,100 to 300,000 to effect coalescence to a large extent of the co-existing original brine droplets with the added water droplets, accompanied by coalescence of added water droplets so that the coalesced water masses will remove the greater part of salt content of the original pipeline oil, and settling and separating the oil and water phases.

CHARLES M. BLAIR, JR.